(12) United States Patent
Shoer et al.

(10) Patent No.: US 11,858,664 B1
(45) Date of Patent: Jan. 2, 2024

(54) SPACECRAFT FOR AEROSPACE MISSION

(71) Applicant: LOCKHEED MARTIN CORPORATION, Bethesda, MD (US)

(72) Inventors: Joseph Paul Shoer, Denver, CO (US); Jeffrey Allen Lewis, Littleton, CO (US); Brian Michael Sutter, Highlands Ranch, CO (US); Emily Elaine Boster, Littleton, CO (US); Timothy Michael Linn, Littleton, CO (US); Mark Andrew Johnson, Parker, CO (US); Jarvis T. Songer, Golden, CO (US); Edward Boneau Bierhaus, Golden, CO (US); Weyman Albert Weems, Littleton, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 304 days.

(21) Appl. No.: 17/389,075

(22) Filed: Jul. 29, 2021

Related U.S. Application Data

(60) Provisional application No. 63/058,390, filed on Jul. 29, 2020.

(51) Int. Cl.
| | | |
|---|---|---|
| *B64G 1/10* | (2006.01) | |
| *B64G 1/24* | (2006.01) | |
| *B64G 1/58* | (2006.01) | |
| *B64G 1/44* | (2006.01) | |
| *B64G 1/40* | (2006.01) | |
| *B64G 1/66* | (2006.01) | |

(52) U.S. Cl.
CPC ............. *B64G 1/105* (2013.01); *B64G 1/242* (2013.01); *B64G 1/40* (2013.01); *B64G 1/44* (2013.01); *B64G 1/58* (2013.01); *B64G 1/66* (2013.01); *B64G 1/1064* (2023.08)

(58) Field of Classification Search
CPC .......... B64G 1/105; B64G 1/242; B64G 1/40; B64G 1/44; B64G 1/58; B64G 1/66; B64G 1/1064
See application file for complete search history.

(56) References Cited

U.S. PATENT DOCUMENTS

| 4,426,052 | A | * | 1/1984 | Hubert | ..................... B64G 1/44 244/172.7 |
| 5,527,001 | A | * | 6/1996 | Stuart | ...................... H01Q 1/08 244/172.6 |
| 8,384,613 | B1 | * | 2/2013 | Murphey | ................ H02S 30/20 343/915 |

(Continued)

FOREIGN PATENT DOCUMENTS

| DE | 102005062841 B4 | * | 12/2009 | ............. B64G 1/222 |
| JP | 2015168422 A | * | 9/2015 | ............... B64G 1/10 |

*Primary Examiner* — Valentina Xavier
(74) *Attorney, Agent, or Firm* — BAKERHOSTETLER

(57) ABSTRACT

Methods and systems for implementing a Jupiter aerospace mission can enable delivery of a science payload to a Jupiter orbit on a direct Earth-to-Jupiter trajectory. Solar power and use of avionics also allow a fast assembly, integration, and test process compared to past outer Solar System missions. The spacecraft can include an aerodynamic forebody, a shell, and a thermal protection system. The spacecraft can manage the radiation environment, generate solar power, and return data to Earth with a robust radio-frequency (RF) amplification and antenna gain.

20 Claims, 7 Drawing Sheets

(56) References Cited

U.S. PATENT DOCUMENTS

| | | | | |
|---|---|---|---|---|
| 8,905,357 B1* | 12/2014 | Harvey | ............... | B64G 1/2427 |
| | | | | 244/172.6 |
| 9,550,584 B1* | 1/2017 | Harvey | ................. | B64G 1/222 |
| 2011/0242663 A1* | 10/2011 | Daily | .................... | G02B 5/005 |
| | | | | 359/601 |
| 2018/0127115 A1* | 5/2018 | Choi | ..................... | B64G 1/641 |

* cited by examiner

SPACECRAFT FOR AEROSPACE MISSION

CROSS-REFERENCE TO RELATED APPLICATION

This application claims the benefit of U.S. Provisional Application No. 63/058,390, entitled "SPRINT JUPITER AEROSPACE MISSION," filed Jul. 29, 2020, the entirety of which is incorporated herein by reference.

STATEMENT REGARDING FEDERALLY SPONSORED RESEARCH OR DEVELOPMENT

Not applicable.

FIELD

The present invention generally relates to aerospace technology, more particularly to a sprint Jupiter aerospace mission.

BACKGROUND

Many outer Solar System orbiter missions have cruise trajectories that employ one or more gravity assists from inner-planet flybys. These flyby maneuvers reduce the required launch energy of the spacecraft at the expense of increasing the mission time. In addition, all planetary orbiter missions to date have performed a propulsive orbit-insertion burn to enter in a closed orbit around their target planets. An orbit-insertion burn requires the spacecraft to carry propellant on board and is most efficiently accomplished with a main engine, which adds mass to the spacecraft design. Around planets with an atmosphere, aerocapture is an enabling technology that can replace propulsive orbit-insertion burn. Typical planetary entry spacecraft include an aerodynamic body and thermal protection system consisting of a heatshield and shell that are discarded during the later stages of the entry process. Mars-entry missions typically include a solar-powered cruise stage that is discarded prior to entry interface. The lander operates on batteries during entry and deploys its own solar panels after reaching the surface.

DETAILED DESCRIPTION

Figure 1:
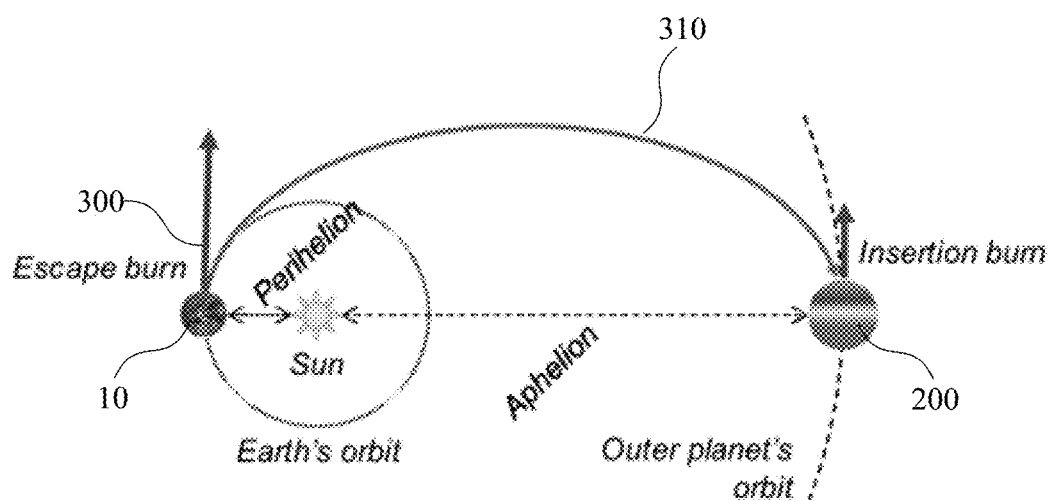
FIG. 1 illustrates a schematic view of a mission path for a spacecraft.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

In some aspects of the present technology, methods and systems for implementing a sprint Jupiter aerospace mission are disclosed. The subject technology enables delivery of a science payload to a Jupiter orbit on a direct Earth-to-Jupiter trajectory. It is understood that the mission through the direct Earth-to-Jupiter trajectory would take less than half the transfer time of the fastest prior Jupiter-orbiter mission. Solar power and use of avionics allow a fast assembly, integration, and test process compared to past outer Solar System missions.

The subject disclosure describes an aerocapture to perform the Jupiter orbit insertion. This would be the first aerocapture of a spacecraft into an orbit around a planetary body. Upon approach to Jupiter, the spacecraft would be targeted to directly enter the atmosphere of Jupiter. The velocity at entry relative to the atmosphere is about 47 km/s. An offset center-of-pressure relative to the center-of-mass results in the creation of a lift vector that can be used to modify the trajectory to correct for delivery errors and unpredicted variations in atmospheric density. By controlling the lift vector, the spacecraft can be effectively flown through the atmosphere to match a preprogrammed deceleration profile. If atmospheric densities are less than expected, the lift vector can pull the spacecraft deeper into the atmosphere to achieve its desired deceleration profile. Conversely, if the atmospheric densities are greater than anticipated, the lift vector can pull the spacecraft up to thinner density regions. This would be the first of its kind for an orbiting spacecraft. Aerocapture also reduces the required propellant load onboard the spacecraft and eliminates the need for a main engine from the design. Therefore, the Earth-to-Jupiter trajectory is a direct, Hohmann transfer type of orbit (an elliptical orbit used to transfer between two circular orbits of different radii in the same plane), which reduces the cruise time and eliminates numerous gravity assists around inner planets.

Features of the spacecraft disclosed herein facilitate 1) aerocapture, which requires an aerodynamic forebody, shell, and thermal protection system; 2) management of the radiation environment using a Juno-like vault or appropriate shielding; 3) solar power generation at Jupiter, which requires a large solar panel area; and 4) data return to Earth, which requires a robust radio-frequency (RF) amplification and antenna gain. The spacecraft dovetails together each of the solutions to these challenges into a novel system-level design. The spacecraft structure accommodates a heatshield (e.g., diameter of up to, less than, or about 1, 2, 3, 4, 5, 6, 7, 8, 9, or 10 m) for the aerocapture, supporting a large area for solar arrays on circumferentially spaced petals. The petals fold in during the capture event to form part of the aerodynamic shell. Completing the shell is a high-gain antenna covered with RF transparent thermal-protection material.

A short mission duration due to the direct-to-Jupiter transfer encourages the use of avionics from the SmallSat industry, including low-power components that enable solar power with a smaller total solar array area than solar-powered outer-planet missions like Juno or Lucy. These components are mounted inside a radiation vault sized to limit their total mission dose to their tested survivability. Choosing the vault position within the spacecraft structure allows placement of the vehicle center of gravity for aerodynamic performance. The overall architecture has a simple single-string avionics design, a modest power budget with margin, and compelling technology demonstration capabilities.

A direct trajectory and aerocapture at an outer planet will be revolutionary for the cadence of outer-planet exploration, since the Av requirements of typical outer-planet missions drive mission designers to choose long, infrequently occurring planetary tours of gravity assists. The spacecraft's direct trajectory with aerocapture delivers the spacecraft to Jupiter orbit less than 29 months after launch. This is less than half the time between launch and Jupiter orbit insertion of the Juno mission (60 months) and much less than the cruise time of the Galileo mission (75 months). In addition, the direct-to-Jupiter trajectory does not depend on a specific alignment of multiple inner and outer Solar System planets, reducing the need for a tightly defined launch date. After reaching the Jupiter, the spacecraft can attain a science orbit with low-velocity flybys of the Galilean satellites after an additional 12 months of period reduction. Further, the projected design and integration schedule for the spacecraft is about 3.5 years, a shorter schedule than is typical for outer Solar System missions.

In some implementations, simple CubeSat avionics and solar power instead of radioisotope thermoelectric generators can enable this design. To provide solar power at Jupiter's distance from the Sun, the spacecraft must incorporate a large solar collection area. Typical aerodynamic entry missions, such as Mars InSight, have lower solar power requirements before entry than after landing; therefore, they include a solar-powered cruise stage that is discarded prior to atmospheric entry. For the spacecraft, however, similar levels of solar power and tens of square meters of array area are required both before and after the aerocapture maneuver is complete. Therefore, it would be inefficient to throw away a large solar array and then redeploy a similar sized array after Jupiter orbit insertion. The spacecraft's incorporation of solar cells onto the back of the heatshield deck and onto stowable petals to form the aerodynamic shell achieves both the compact aerodynamic shape needed for planetary aerocapture and the solar array area required for power at Jupiter.

Sending a spacecraft to outer planets usually takes place through several flybys of inner planets, which can take more time while saving energy. The longer mission duration requires spacecraft with longer-life components and longer mission operations that result in a higher cost for the mission. There are other issues to be considered, for example, a designed trajectory can only work when the various planets for flyby are in the right places, meaning that the launch has to take place on an exact date. The other issues with long mission duration are slow data return and harsh radiation environment.

FIG. 1 is a diagram illustrating an example of an elliptical transfer orbit around the Sun. One way to achieve a shorter mission time is to fly on a direct trajectory, for example, an elliptical transfer orbit around the Sun, with perihelion at the Earth 10 and aphelion at the destination (e.g., outer planet 200). Velocity at perihelion depends on aphelion distance, so the spacecraft has to leave the Earth with a large velocity (i.e., with the assistance of a large launch vehicle). Once it arrives at the outer planet 200, it has to slow down again (usually by a great amount of onboard propulsion). Large launch vehicles are expensive and require large propellant tanks, which need higher power to keep warm. The higher power requires large solar arrays that can be installed on large spacecraft structures, which are expensive.

For launch (e.g., launch segment 300, as shown in FIG. 1), the spacecraft can be integrated with solar petals closed and attached to a launch vehicle adapter through attachment points in the heatshield, as described further herein. After spacecraft separation (e.g., during cruise segment 310), the petals open to provide solar power during the cruise to an outer planet 200 (e.g., Jupiter), as described further herein.

Figure 2:
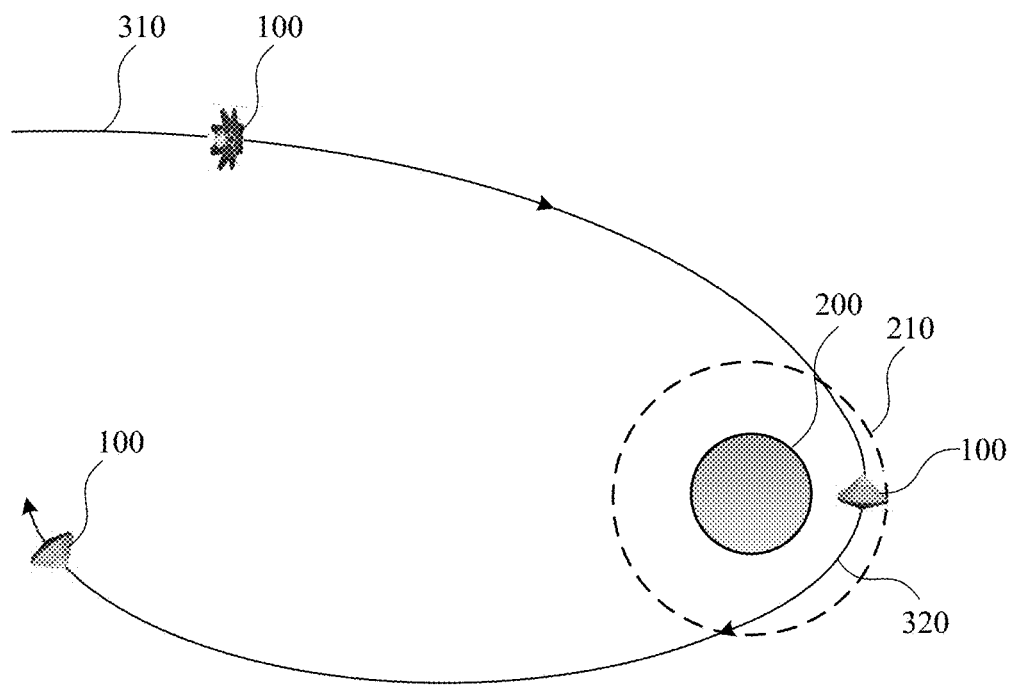
FIG. 2 illustrates a schematic view of a segment of a mission path for a spacecraft.

FIG. 2 is a diagram illustrating a schematic view of a segment of a mission path for a spacecraft. As shown in FIG. 2, the cruise segment 310 can lead into an aerocapture segment 320 about the outer planet 200. Upon arrival at the outer planet 200 (e.g., Jupiter), the spacecraft 100 closes its petals for the aerocapture maneuver. For example, the spacecraft 100 can be transition to an aerocapture configuration with solar petals closed, and the spacecraft 100 can enter into the atmosphere 210 of the outer planet 200 from an interplanetary approach trajectory. The aerodynamic drag generated as the vehicle descends into the atmosphere 210 slows the spacecraft 100.

Figure 3:
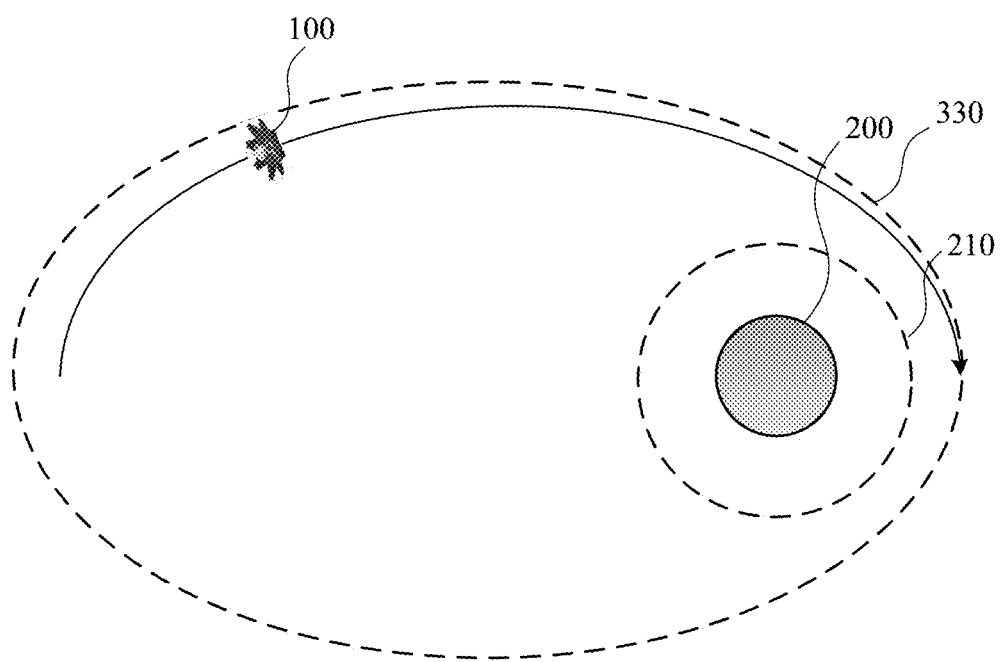
FIG. 3 illustrates a schematic view of another segment of a mission path for a spacecraft.

FIG. 3 is a diagram illustrating a schematic view of another segment of a mission path for a spacecraft. After the spacecraft 100 slows enough to be captured by the planet 200, it exits the atmosphere 210 and executes a small propulsive burn at the first apoapsis to raise the periapsis outside the atmosphere. Additional small burns may be required to correct apoapsis and inclination targeting errors before the initial science orbit (i.e., orbit segment 330) is established. In some embodiments, there is only one aerocapture maneuver, so after the aerocapture maneuver (i.e., in aerocapture segment 320) is complete, the spacecraft 100 jettisons its heatshield and opens the petals again for the rest of the mission (e.g., in orbit about the outer planet 200 during an orbit segment 330).

The direct trajectory from the Earth to the destination outer planet (e.g., Jupiter), only requires alignment of the Earth and the destination outer planet (e.g., Jupiter), once a year. The aerocapture scheme enables missions to handle high arrival velocity, while the disclosed architecture optimizes the fastest trajectory with the smallest spacecraft on the smallest launch vehicle. The direct trajectory mission to the destination outer planet (e.g., Jupiter) of the subject technology may take about 29 months, which is shorter than the nearly 60-month mission duration of Juno. This allows shorter-lifetime duration avionics, a single string, and a smaller propulsion system that requires less power to heat, saves on overall power consumption, and has less overall mass.

Figure 4:
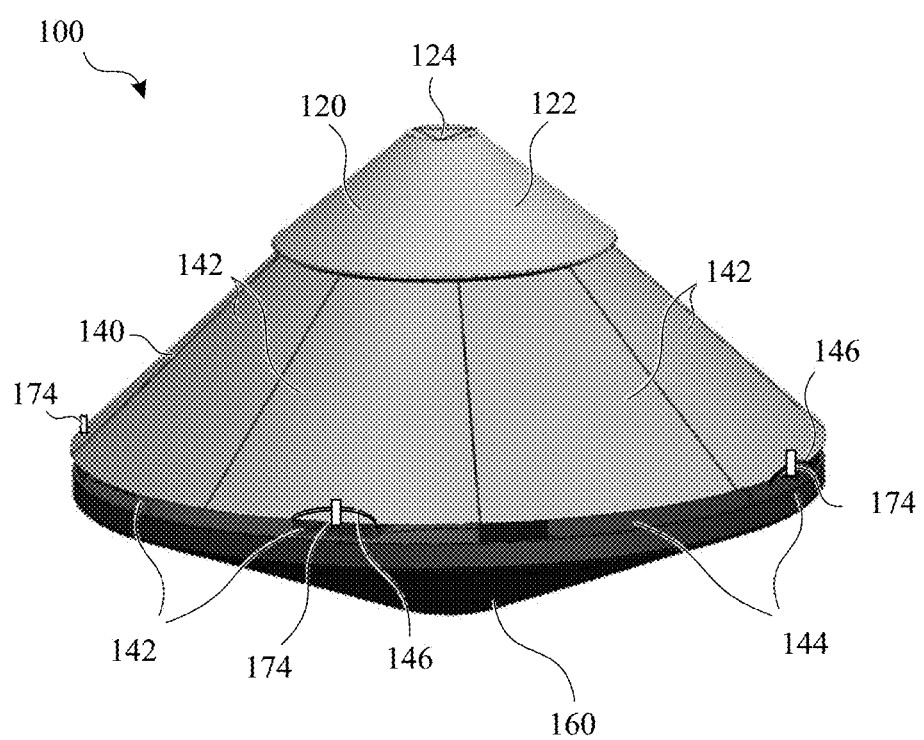
FIG. 4 illustrates a perspective view of a spacecraft in a launch configuration or an aerocapture configuration with a closed shell and a heatshield.

FIG. 4 is a diagram illustrating an example system architecture for a spacecraft that can enable direct trajectory missions, according to certain aspects of the subject technology.

In an aerocapture scheme described herein, instead of a propulsive insertion maneuver, $\Delta v$ from drag is gained as the spacecraft passes through an outer planet's atmosphere 210. The aerocapture scheme is enabled, at least in part, by a redeployable shell 140 and solar arrays. The redeployable shell 140 can include multiple petals 142. Each of the petals 142 can be independently and rotatably coupled (e.g., by hinges 144) to a frame of the spacecraft 100. In the close configuration of the shell 140, as shown in FIG. 4, the petals 142 can extend from the frame and/or the heatshield 162 and end cap 120 of the spacecraft 100. Together, the petals 142 of the shell 140 can form a continuous barrier surrounding an interior region of the spacecraft 100. As such, the shell 140 can provide protection to components of the spacecraft 100 stored therein.

The spacecraft 100 can further include one or more thrusters 174 located, for example, at or near an outer periphery of the spacecraft 100. The thrusters 174 can provide attitude control for momentum desaturation and slew capability. The thrusters 174 can extend through openings 146 in the petals 142 of the shell 140 to provide control authority during the aerocapture pass. The thrusters 174 can be fueled by, for example, a hydrazine mono-prop system or another type of system. At least some of the thrusters 174 can be oriented in a common direction (e.g., along the axis of the spacecraft 100) for trajectory correction maneuvers (TCMs), and at least some of some of the thrusters 174 can be oriented laterally for roll control, especially during the aerocapture.

The end cap 120 can include a housing 122 and an antenna 124. The housing 122 can form a radome structure that protects the antenna 124 while minimally attenuating the electromagnetic signal transmitted and/or received by the antenna. For example, the housing 122 can be essentially transparent to radio waves.

The shell 140 can be provided in the closed configuration during a launch segment (e.g., in a launch configuration) and/or during an aerocapture segment (e.g., in an aerocapture configuration). The heatshield 160 can be the leading face of the spacecraft 100 and provide thermal protection during the aerocapture maneuver. The shell 140 can be closed to extend to the end cap 120. As such, the heatshield 160, the shell 140, and the end cap 120 can, together, define the outer periphery of the spacecraft 100 while in the closed configuration (e.g., for launch and/or aerocapture). Material (s), such as thermoplastic styrenic ("TPS") elastomers, can be provided to protect the petals 142, and RF transparent materials, such as thermoplastic styrenic elastomers, can be provided to protect the upper surface of the end cap 120. Plate and/or finger seals can be provided around each petal 142 and thruster opening 146 to provide effective aerothermal performance in the closed configuration of the shell 140.

Figure 5:
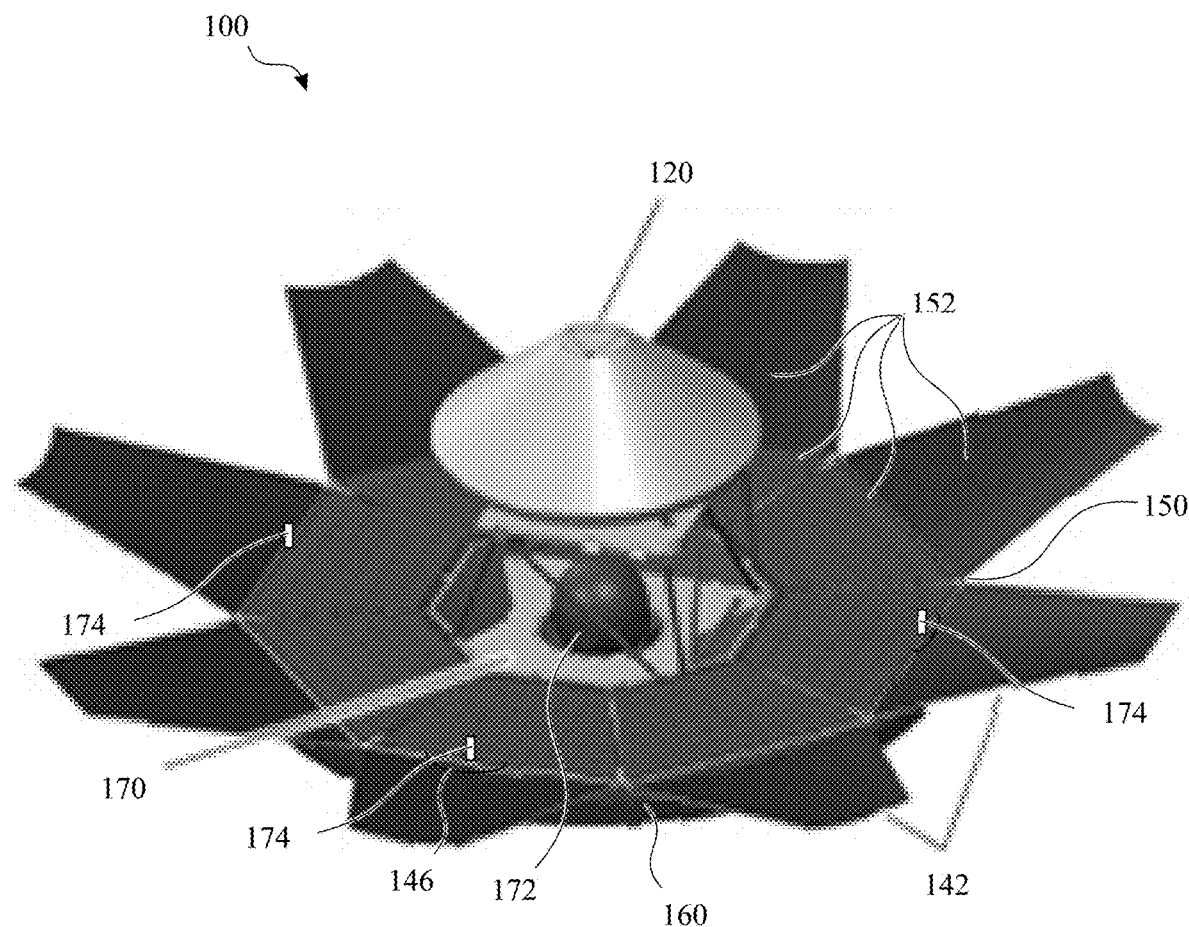
FIG. 5 illustrates a perspective view of the spacecraft of FIG. 2 in a cruise configuration with an open shell and a heatshield.

FIG. 5 is a diagram illustrating the spacecraft of FIG. 4 with a shell in an open configuration according to certain aspects of the subject technology.

As shown in FIG. 5, the petals 142 can transition (e.g., splay) radially outwardly. The petals 142 of the shell can be deployed after launch vehicle separation, fold before the aerocapture, and then unfold and/or deploy again after the aerocapture. For example, each of the petals 142 can rotate about a corresponding hinge that couples the petal 142 to a frame 150. The petals 142 can rotate in unison or independently. For example, movement (e.g., rotation) of the petals 142 can be controlled by a single motor on each petal 142, or with one motor driving multiple petals 142 (e.g., up to all of the petals 142). The openings 146 can facilitate movement of the petals 142 over the thrusters 174 without contacting the thrusters 174. As such, the thrusters can remain fixedly coupled to the frame 150 for use while the shell 140 is in the open or closed configuration.

The frame 150 can support one or more solar panels 152. As the petals 142 of the shell 140 transition to an open configuration, the solar panels 152 can become exposed for receiving light. At least some of the solar panels 152 can be supported by the frame on a side that faces the end cap 120, such that the solar panels 152 face generally in a direction that is in the direction targeted by the antenna of the end cap 120. Additionally or alternatively, one or more solar panels 152 can be provided on an inner side of one or more of the petals 142, which can similarly face in the direction of the end cap 120 when the shell 140 is in the open configuration. The frame 150 can provide protection for avionics (e.g., within an interior of the spacecraft 100) and can offset a center of gravity for the lift vector. The solar panels 152 can include short, medium, and long strings to manage the range of Sun distances from Earth launch to the outer planet (e.g., Jupiter).

A propellant tank 172 can be located in a center (e.g., center of gravity) of the structure. The propellant can include, for example, hydrazine, another mono-propellant, and/or another propellant. The propellant tank 172 can be in fluid communication with each of the thrusters 174.

Figure 6:
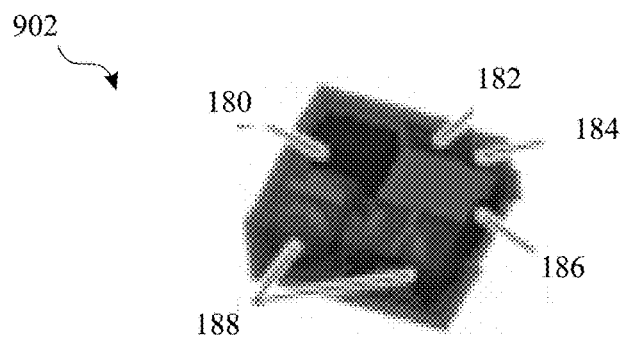
FIG. 6 illustrates a perspective view of a control unit of the spacecraft of FIGS. 1 and 2.

FIG. 6 is a diagram illustrating the control unit of the spacecraft of FIGS. 4 and 5 according to certain aspects of the subject technology.

As shown in FIG. 6, the control unit can include various avionics and other electrical components for controlling one or operations of the spacecraft 100. For example, the control unit 902 can include and/or be connected to a transponder 180, reaction wheels 188, a power distribution module 186, a command and data-handling system 182, and/or an inertial mass unit ("IMU") 184. The control unit 902 can be stored within an interior region of the spacecraft 100 and protected by the external components and/or the frame 50.

The power distribution module 186 can include miniaturized pyro and thruster control components. The power distribution module 186 can be connected to the solar panels and include or be connected to a battery. The battery can be selected to store and provide power during the longest continuous off-Sun time, including the aerocapture, maneuvers, science flyby, and eclipses.

The control unit 902 can manage temperature control with electric heaters and thermostats of the spacecraft. The coatings (e.g., TPS materials) on the end cap and backing the solar panels can provide additional insulation to these components during an eclipse.

One or more sensors can be provided, including star trackers, Sun sensors, and/or an MEMS (micro-electro-mechanical-systems) IMU to provide attitude determination. The IMU can serve as a secondary sensor for propagating attitude information during star tracker outages, as well as providing acceleration feedback during the aerocapture pass. The aerocapture maneuver involves the spacecraft controlling its attitude to point a lift vector up or down, relative to the planet, to control the magnitude of the aerodynamic drag force measured by the accelerometer by dipping further in or out of the atmosphere.

In some embodiments, a single-string, single board computer and daughter card can provide on-board computing and interface capability to bus components. This component incorporates almost the entire functionality of heritage Lockheed Martin command and data handling architectures, trading potentially lower reliability and redundancy to achieve low hardware cost, faster integration time, low power, and substantial volume (and therefore mass) reduction of the avionics vault. This is a favorable trade on a relatively short-duration mission. On-board storage on the CDH card accommodates the science data from each Europa flyby listed in Table 3-1. The total dose tolerance of the computer is 30 krad, which satisfies the 25 krad environmental requirement with margin.

Components mounted to the aft deck (vault, instruments, and batteries) can be placed to locate the spacecraft center of gravity for aerodynamic stability. Choosing the placement of these massive components will also create the CG-CP offset needed to produce a lift vector during aerocapture.

A telecommunications subsystem can be provided. An amplifier (e.g., traveling-wave tube amplifier) can amplify an RF signal to a 2 m diameter high-gain antenna, providing enough link margin and data rate at the outer planet (e.g., Jupiter) to download the science data. Low-gain antennas provide additional wide-beam coverage for operations near the Earth at the beginning of the mission.

Figure 7:
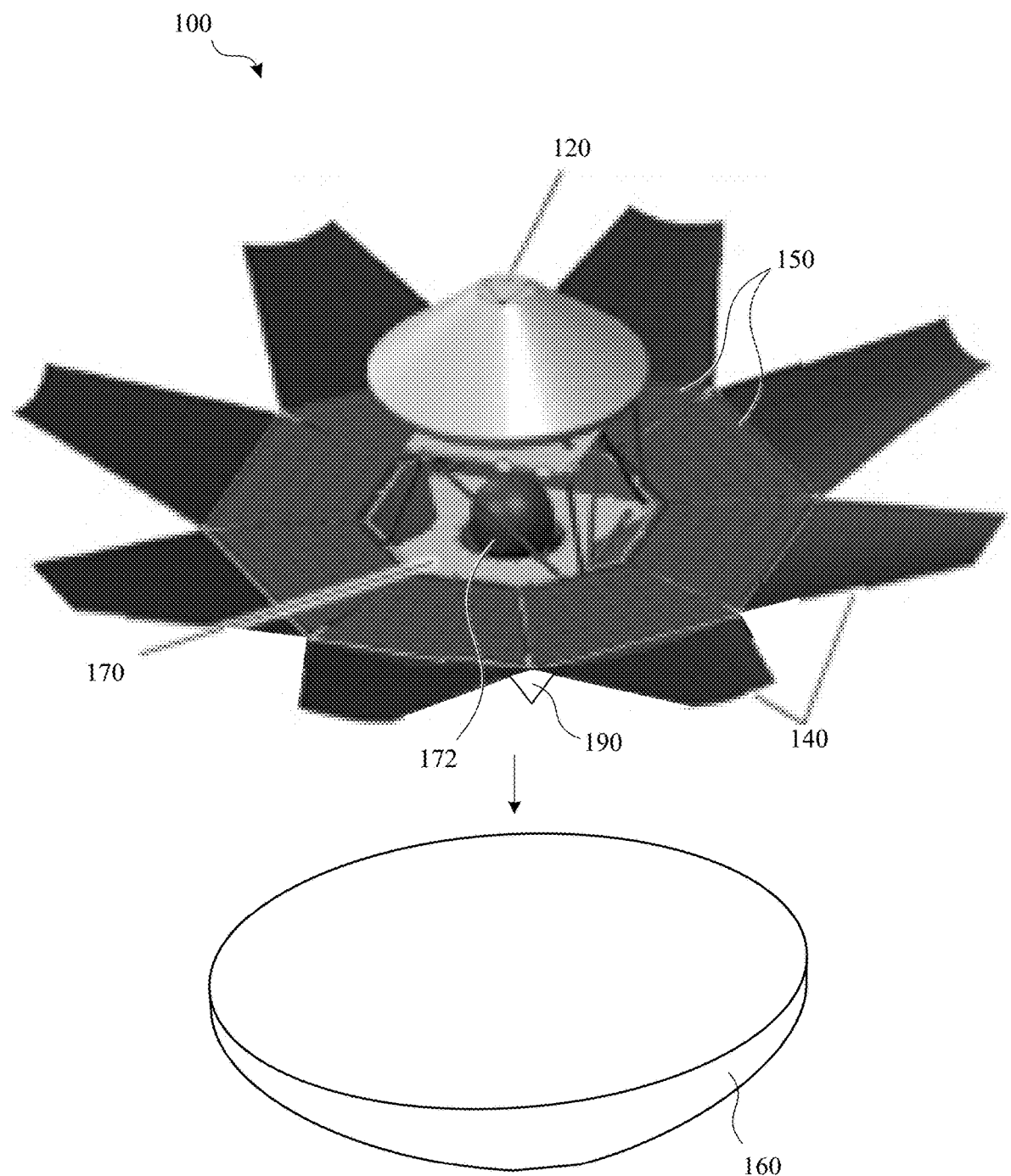
FIG. 7 illustrates a perspective view of the spacecraft of FIGS. 2 and 3 in a science configuration with an open shell and a jettisoned heatshield.

FIG. 7 is a diagram illustrating the spacecraft of FIGS. 4 and 5 with a shell in an open configuration and having jettisoned the heatshield according to certain aspects of the subject technology.

As shown in FIG. 7, the petals 142 can transition (e.g., splay) radially outwardly. The petals 142 of the shell can be deployed after the aerocapture. Additionally, the heatshield 160 can be jettisoned. To jettisoning the heatshield 160, the heatshield 160 can be retained to the frame and/or other components of the spacecraft 100 by one or more of a variety of mechanisms. For example, the heatshield 160 can be retained with one or more latches, locks, hinges, actuators, motors, and/or other mechanisms to control the retention of the heatshield 160.

Once the heatshield 160 is jettisoned, one or more instruments 190 can be exposed. These instruments can have been protected by the heatshield 160 during prior maneuvers, such as the aerocapture maneuver. As described herein, only one Aero Truman over may be required to achieve a stable orbit about the outer planet. As such, the heatshield may be unnecessary following the aerocapture. Additionally, the instruments 190 can be utilized during the orbit about the outer planet. For example, the instruments 190 can include sensors, cameras, spectrographs, interferometers, and the like. Ample, the instrument 190 can include any device that can be operated to capture data. The capture data can be transmitted to Earth with the communications system, including the antenna of the end cap.

Figure 8:
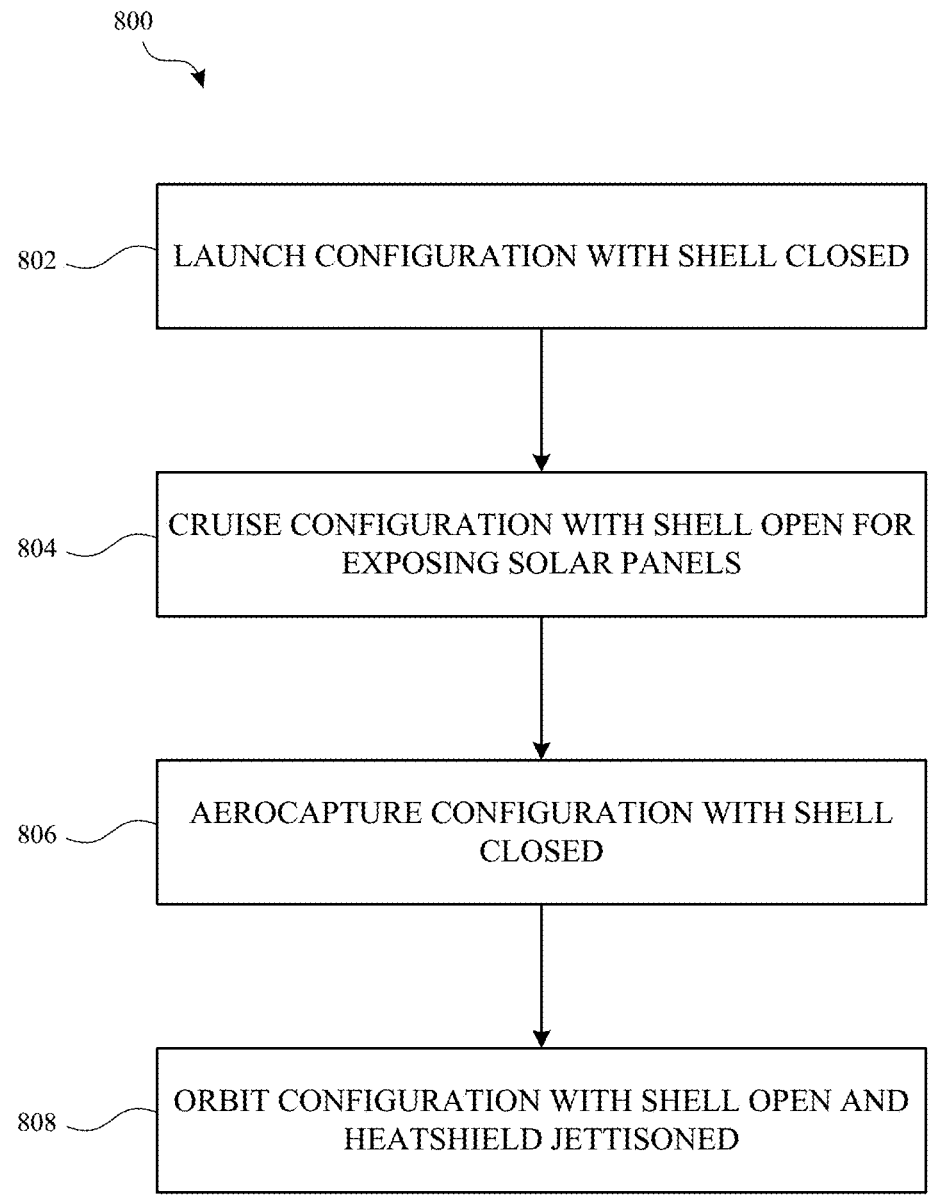
FIG. 8 illustrates a flow chart for operation of a spacecraft.

FIG. 8 illustrates a block diagram of a process 800 for a spacecraft according to one or more implementations of the subject technology. For explanatory purposes, the process 800 is primarily described herein with reference to the spacecraft and its subsystems. The process 800 may be performed by one or more components or circuits of the spacecraft. Further for explanatory purposes, the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

The process 800 starts at step 802, in which the spacecraft is launched from an origin, for example, with the assistance of a launch vehicle. While in the launch configuration, the shell of the spacecraft can be closed, and the end cap, shell, and heatshield can provide protection to components stored within an interior region of the spacecraft.

At step 804, the spacecraft can transition to a cruise configuration with the shell open for exposing solar panels of the spacecraft. The solar panels can provide power for operations of the spacecraft, including sensing, temperature management, and/or communications.

At step 806, the spacecraft can transition to an aerocapture configuration with the shell closed. In such a configuration, the heatshield and the closed shell can provide protection during an aerocapture maneuver. Accordingly, the shell can be closed prior to commencement of the aerocapture maneuver.

At step 808, the spacecraft can transition to an orbit configuration with the shell being open again for exposing solar panels of the spacecraft. Additionally, the heatshield of the spacecraft can be jettisoned, as no additional aerocapture maneuver may be needed. By jettisoning the heatshield, instruments can be exposed for operation during orbit about the outer planet.

Figure 9:
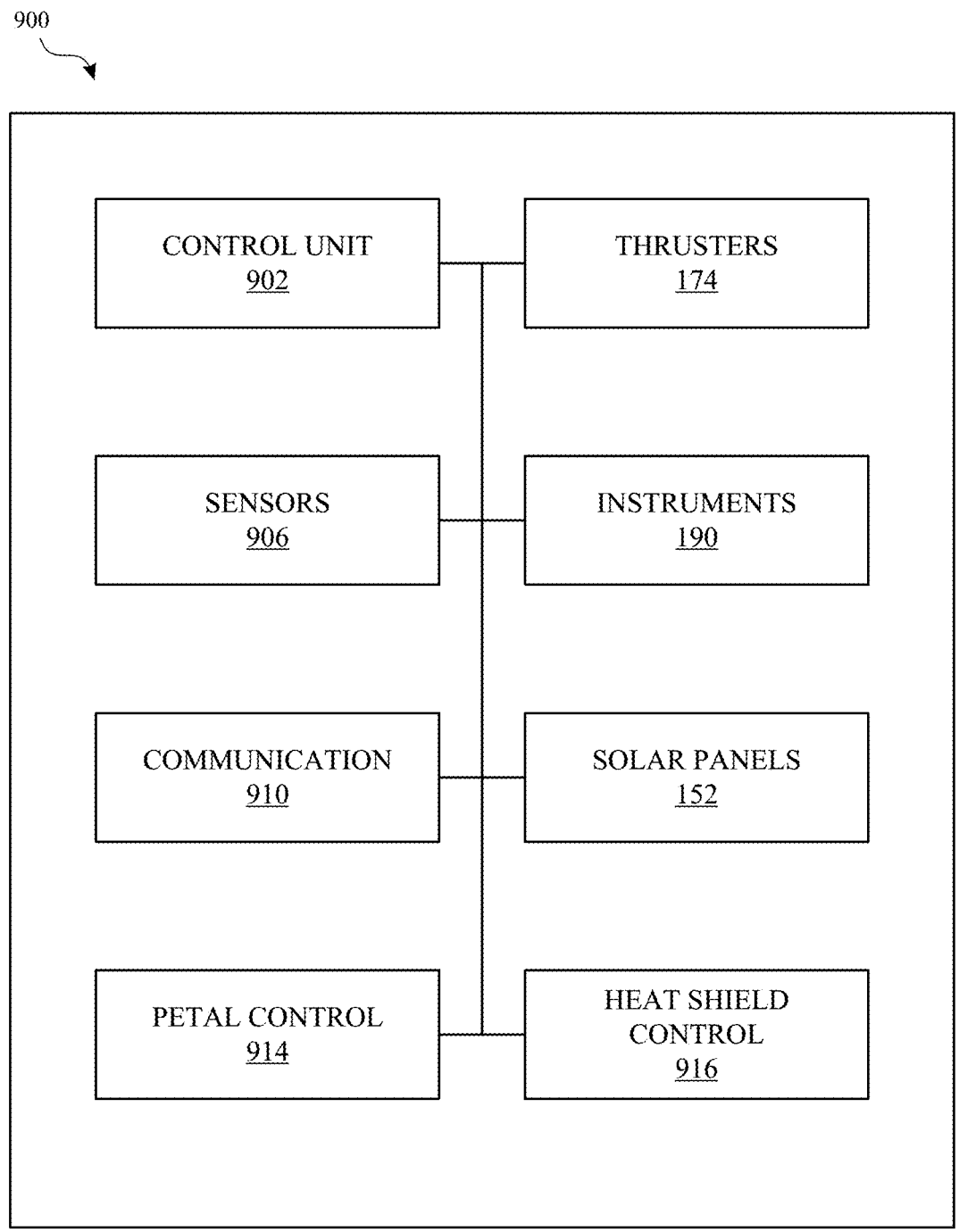
FIG. 9 illustrates a block diagram of a spacecraft.

FIG. 9 is a block diagram that illustrates a computer system 900 upon which an embodiment of the subject disclosure may be implemented. Computer system 900 includes a bus or other communication mechanism for communicating information, and a processor (e.g., of the control unit 902) coupled with the bus for processing information. Computer system 900 can also include a memory, such as a random access memory ("RAM") or other dynamic storage device, coupled to bus for storing information and instructions to be executed by processor 904. The memory may also be used for storing temporary variables or other intermediate information during execution of instructions by the processor.

The control unit 902 can include or be operably connected to one or more other components of the computer system 900. For example, the control unit 902 can be operably connected to the thrusters 174 and/or sensors 906 (e.g., IMU, star tracker, etc.) for performing avionic operations. The control unit 902 can further be operably connected to any instruments 190 that are exposed upon jettisoning the heatshield. The control unit 902 can also be operably connected to a communication module 910, including one or more connections to the antenna of the spacecraft for transmitting and/or receiving signals. The control unit 902 can also be operably connected to solar panels 152, such as through the power distribution module. The control unit 902 can also be operably connected to one or more motors, actuators, and the like to controllably deploy and/or retract the petals with a petal control module 914. The control unit 902 can also be operably connected to one or more motors, actuators, and the like to controllably retain and/or jettison the heatshield with a heatshield control module 916.

The description of the subject technology is provided to enable any person skilled in the art to practice the various embodiments described herein. While the subject technology has been particularly described with reference to the various figures and embodiments, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these embodiments may be readily apparent to those skilled in the art, and generic principles defined herein may be applied to other embodiments. Thus, many changes and modifications may be made to the subject technology, by one having ordinary skill in the art, without departing from the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A spacecraft comprising:
a frame supporting solar panels;
an end cap on a first side of the frame, the end cap comprising an antenna;
a shell comprising multiple petals, each of the petals being rotatably coupled to the frame to enclose the solar panels in a closed configuration of the shell and expose the solar panels in an open configuration of the shell; and
a heatshield on a second side of the frame that is opposite the first side.

2. The spacecraft of claim 1, wherein the end cap comprises an outer housing surrounding the antenna.

3. The spacecraft of claim 2, wherein the outer housing forms at least a portion of a conical or frustoconical shape.

4. The spacecraft of claim 2, wherein each of the petals abuts the outer housing when the shell is in the closed configuration.

5. The spacecraft of claim 1, wherein each of the petals is coupled to the frame with a corresponding hinge.

6. The spacecraft of claim 1, further comprising thrusters extending from the frame.

7. The spacecraft of claim 6, wherein the shell comprises openings such that, while the shell is in the closed configuration, the thrusters extend through the openings.

8. The spacecraft of claim 1, wherein the shell, while in the closed configuration, forms at least a portion of a conical or frustoconical shape.

9. The spacecraft of claim 1, wherein the heatshield is releasably coupled to the frame and covering an instrument.

10. A spacecraft comprising:
a frame supporting solar panels and an instrument;
a shell comprising multiple petals, each of the petals being rotatably coupled to the frame;
a heatshield releasably coupled to the frame and covering the instrument; and
a controller configured to:
maintain the shell in a closed configuration to cover the solar panels during launch from a first planet;
transition the shell to an open configuration to expose the solar panels during transit from the first planet; and
transition the shell to the closed configuration to cover the solar panels during aerocapture about a second planet.

11. The spacecraft of claim 10, wherein the controller is further configured to transition the shell to the open configuration to expose the solar panels during orbit about the second planet.

12. The spacecraft of claim 10, wherein the controller is further configured to jettison the heatshield to expose the instrument during orbit about the second planet.

13. The spacecraft of claim 10, further comprising thrusters extending from the frame.

14. The spacecraft of claim 13, further comprising an end cap on a side of the frame that is opposite the heatshield, the end cap comprising an outer housing and an antenna.

15. The spacecraft of claim 14, wherein the controller is further configured to:
operate the thrusters to orient the antenna towards the first planet; and
operate the antenna to transmit signals to the first planet.

16. A spacecraft comprising:
an end cap;
a heatshield; and
a shell between the end cap and the heatshield, the shell comprising multiple petals, each of the petals extending from the end cap to the heatshield and being configured to splay radially outwardly from a closed configuration of the shell to an open configuration of the shell, wherein, while the shell is in the closed configuration, the end cap, the heatshield, and the shell form a continuous structure enclosing an interior region of the spacecraft.

17. The spacecraft of claim 16, further comprising solar panels within the interior region.

18. The spacecraft of claim 16, further comprising solar panels within the interior region.

19. The spacecraft of claim 16, wherein:
the interior region is a first interior region; and
the heatshield is releasably coupled to shell to enclose a second interior region containing an instrument.

20. The spacecraft of claim 16, wherein each of the petals is rotatable about a hinge.

* * * * *